(12) United States Patent
Lin

(10) Patent No.: US 11,626,255 B2
(45) Date of Patent: Apr. 11, 2023

(54) CAPACITOR ASSEMBLY PACKAGE STRUCTURE

(71) Applicant: APAQ TECHNOLOGY CO., LTD., Miaoli County (TW)

(72) Inventor: Chieh Lin, Hsinchu County (TW)

(73) Assignee: APAQ TECHNOLOGY CO., LTD., Miaoli County (TW)

(*) Notice: Subject to any disclaimer, the term of this patent is extended or adjusted under 35 U.S.C. 154(b) by 39 days.

(21) Appl. No.: 17/024,875

(22) Filed: Sep. 18, 2020

(65) Prior Publication Data

US 2021/0327651 A1  Oct. 21, 2021

(30) Foreign Application Priority Data

Apr. 15, 2020  (TW) .................. 109112613

(51) Int. Cl.
  *H01G 9/012* (2006.01)
  *H01G 9/08* (2006.01)
  *H01G 9/15* (2006.01)

(52) U.S. Cl.
  CPC ............ *H01G 9/012* (2013.01); *H01G 9/08* (2013.01); *H01G 9/15* (2013.01)

(58) Field of Classification Search
  CPC ............ H01G 9/012; H01G 9/08; H01G 9/15
  See application file for complete search history.

(56) References Cited

U.S. PATENT DOCUMENTS

| | | | | |
|---|---|---|---|---|
| 9,916,935 B2* | 3/2018 | Navratil | ............... | H01G 9/0029 |
| 11,170,941 B2* | 11/2021 | Furukawa | ................ | H01G 9/15 |
| 2002/0001169 A1* | 1/2002 | Shiraishi | .................. | H01G 9/26 |
| | | | | 361/523 |
| 2004/0264111 A1* | 12/2004 | Shimoyama | ........... | H01G 9/012 |
| | | | | 361/523 |
| 2010/0165547 A1* | 7/2010 | Kuranuki | ............... | H01G 9/012 |
| | | | | 361/525 |
| 2016/0071654 A1* | 3/2016 | Kimura | .................... | H01G 9/14 |
| | | | | 156/60 |
| 2017/0140877 A1* | 5/2017 | Kuromi | .................. | H01G 9/012 |
| | | (Continued) | | |

FOREIGN PATENT DOCUMENTS

JP  2005045007 A  *  2/2005  ............. H01G 9/012

*Primary Examiner* — David M Sinclair
(74) *Attorney, Agent, or Firm* — Li & Cai Intellectual Property (USA) Office

(57) ABSTRACT

A capacitor assembly package structure and a method of manufacturing the same are provided. The capacitor assembly package structure includes a capacitor unit, an insulative package body, a conductive connection layer and an electrode unit. The capacitor unit includes a plurality of capacitors, and each capacitor includes a positive portion and a negative portion. The insulative package body partially encloses the capacitors, and the positive portion has a positive lateral surface exposed from a first lateral surface of the insulative package body. The conductive connection layer is electrically connected to the negative portion. The electrode unit includes a first electrode structure and a second electrode structure. The first electrode structure encloses a first portion of the insulative package body and electrically connects to the positive portion, and the second electrode structure encloses a second portion of the insulative package body and electrically connects to the conductive connection layer.

6 Claims, 10 Drawing Sheets

(56) References Cited

U.S. PATENT DOCUMENTS

| | | | |
|---|---|---|---|
| 2017/0365419 A1* | 12/2017 | Demizu | H01G 9/15 |
| 2019/0237266 A1* | 8/2019 | Tsutsumi | H01G 9/012 |
| 2020/0211784 A1* | 7/2020 | Tamatani | H01G 9/025 |
| 2020/0266005 A1* | 8/2020 | Suzuki | H01G 9/0032 |
| 2020/0335284 A1* | 10/2020 | Yamazaki | H01G 9/012 |
| 2021/0383976 A1* | 12/2021 | Tamatani | H01G 4/2325 |

* cited by examiner

CAPACITOR ASSEMBLY PACKAGE STRUCTURE

CROSS-REFERENCE TO RELATED PATENT APPLICATION

This application claims the benefit of priority to Taiwan Patent Application No. 109112613, filed on Apr. 15, 2020. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a package structure and a method of manufacturing the same, and more particularly to a capacitor assembly package structure and a method of manufacturing the same.

BACKGROUND OF THE DISCLOSURE

Various applications of capacitors include being used in home appliances, computer motherboards and peripherals, power supplies, communication products and automobiles. Capacitors such as solid electrolytic capacitors are mainly used to provide functions such as filtering, bypassing, rectifying, coupling, blocking and transforming Because the solid electrolytic capacitor has the advantages of being small sized, having large electrical capacity, and having good frequency characteristic, it can be used as a decoupling element in the power circuit of a central processing unit (CPU). In general, a plurality of capacitor elements is stacked together to form a stacked solid electrolytic capacitor with a high electrical capacity. In addition, the stacked solid electrolytic capacitor of the related art includes a plurality of capacitor elements and a lead frame. Each capacitor element includes an anode part, a cathode part and an insulating part. The insulating part is insulated from the anode part and the cathode part. More specifically, the cathode parts of the capacitor elements are stacked on top of one another.

SUMMARY OF THE DISCLOSURE

In response to the above-referenced technical inadequacies, the present disclosure provides a capacitor assembly package structure and a method of manufacturing the same.

In one aspect, the present disclosure provides a capacitor assembly package structure, including a capacitor unit, an insulative package body, a conductive connection layer and an electrode unit. The capacitor unit includes a plurality of capacitors, and each of the capacitors includes a positive portion and a negative portion. The insulative package body partially encloses the capacitors, and the positive portion of each of the capacitors has a positive lateral surface exposed from a first lateral surface of the insulative package body. The conductive connection layer is electrically connected to the negative portion of the capacitor. The electrode unit includes a first electrode structure and a second electrode structure. The first electrode structure encloses a first portion of the insulative package body and electrically connects to the positive portion of each of the capacitors, and the second electrode structure encloses a second portion of the insulative package body and electrically connects to the conductive connection layer.

In another aspect, the present disclosure provides a capacitor assembly package structure, including a capacitor, an insulative package body, a conductive connection layer and an electrode unit. The capacitor includes a positive portion, a negative portion and a surrounding insulative layer. The insulative package body partially encloses the capacitor, and the positive portion of the capacitor has a positive lateral surface exposed from a first lateral surface of the insulative package body. The conductive connection layer is electrically connected to the negative portion of the capacitor. The electrode unit includes a first electrode structure and a second electrode structure. The first electrode structure encloses a first portion of the insulative package body and electrically connects to the positive portion of the capacitor, and the second electrode structure encloses a second portion of the insulative package body and electrically connects to the conductive connection layer. The first lateral surface of the insulative package body, the positive lateral surface of the positive portion and a lateral surface of the surrounding insulative layer are flush with each other.

In yet another aspect, the present disclosure provides a method of manufacturing a capacitor assembly package structure, including: providing a capacitor unit and a conductive connection layer, wherein the capacitor unit includes a plurality of capacitors, and each of the capacitors includes a positive portion and a negative portion electrically connected to the conductive connection layer; partially enclosing the capacitors by an insulative package body, wherein the positive portion of each of the capacitors has a positive lateral surface exposed from a first lateral surface of the insulative package body; and then enclosing a first portion of the insulative package body and electrically connecting to the positive portion of each of the capacitors by a first electrode structure, and enclosing a second portion of the insulative package body and electrically connecting to the conductive connection layer by a second electrode structure. The first lateral surface of the insulative package body and the positive lateral surface of the positive portion are flush with each other.

Therefore, by virtue of "the positive portion of the capacitor has a positive lateral surface exposed from a first lateral surface of the insulative package body", when the first electrode structure encloses a first portion of the insulative package body, the first electrode structure can electrically connect to the positive portion of the capacitor.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
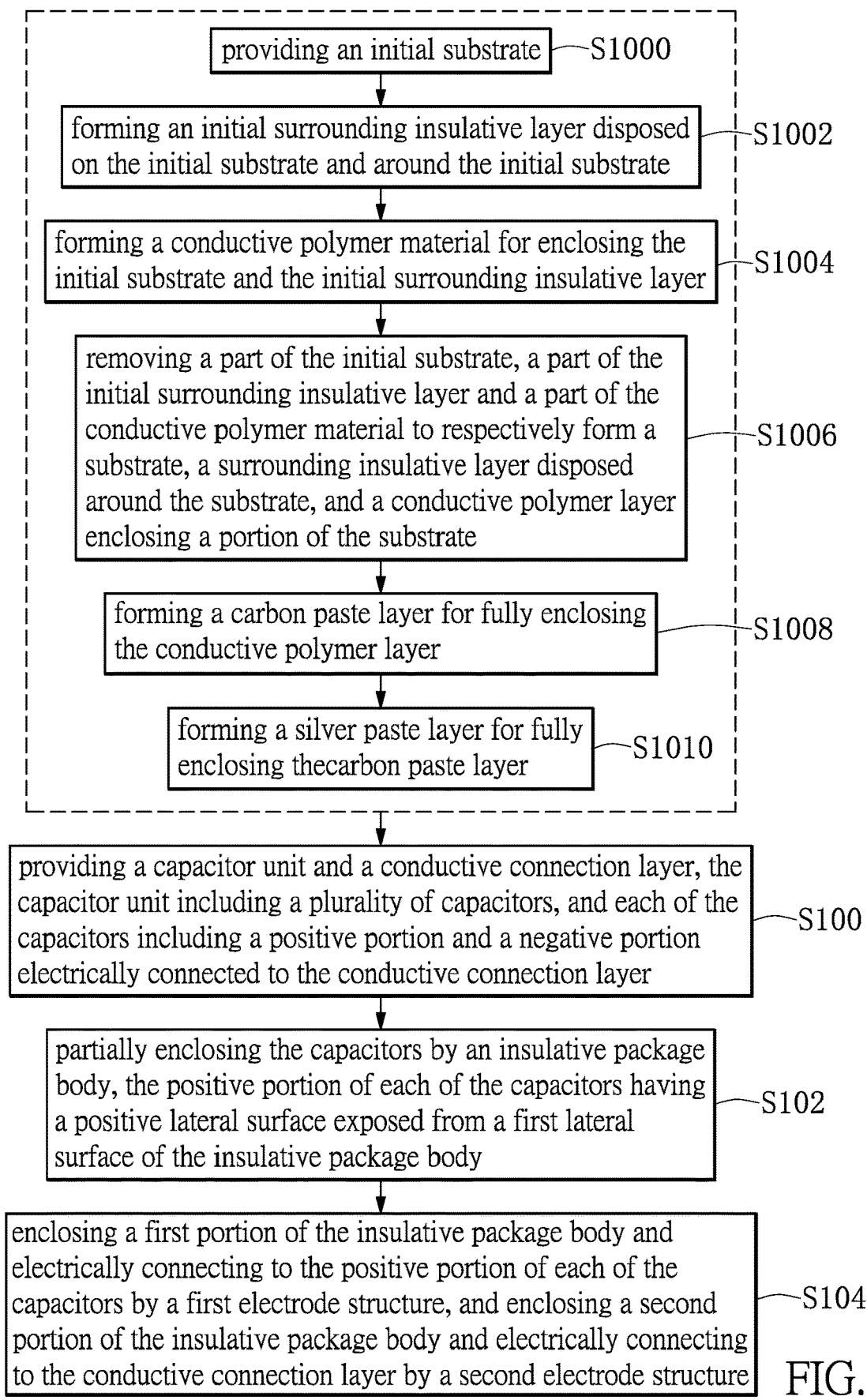
FIG. 1 is a flowchart of a method of manufacturing a capacitor assembly package structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Figure 4:
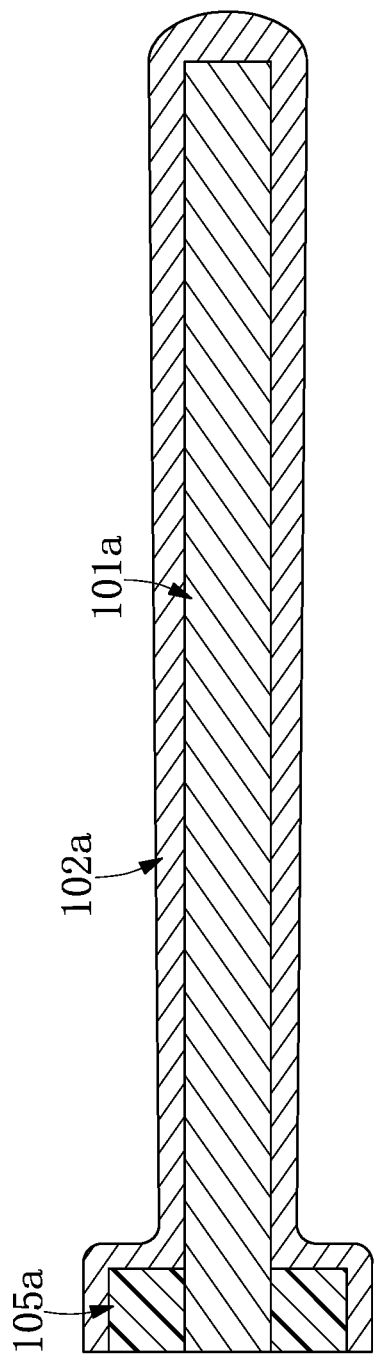
FIG. 4 is a schematic view of an initial substrate, an initial surrounding insulative layer and a conductive polymer material that are partially cut along a cutting line of FIG. 3 according to the first embodiment of the present disclosure.
Figure 5:
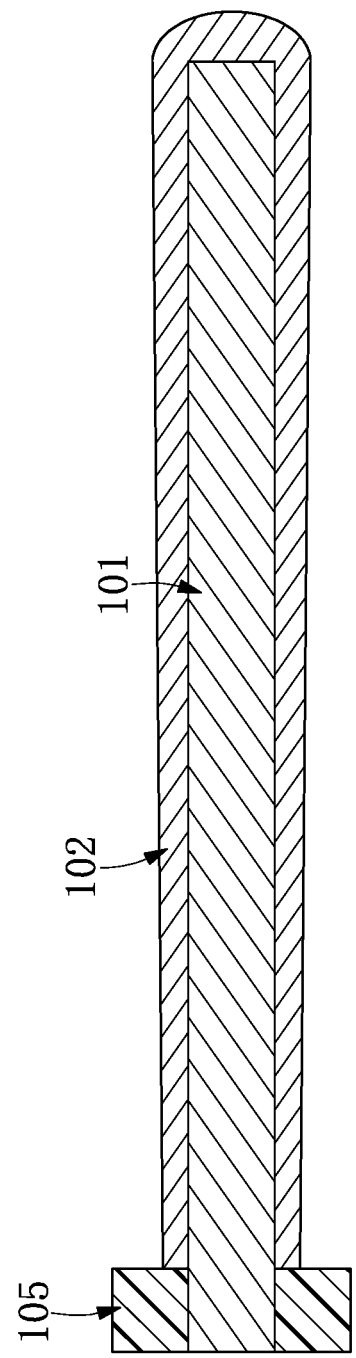
FIG. 5 is a schematic view of a step S1006 of the method of manufacturing the capacitor assembly package structure according to the first embodiment of the present disclosure.
Figure 6:
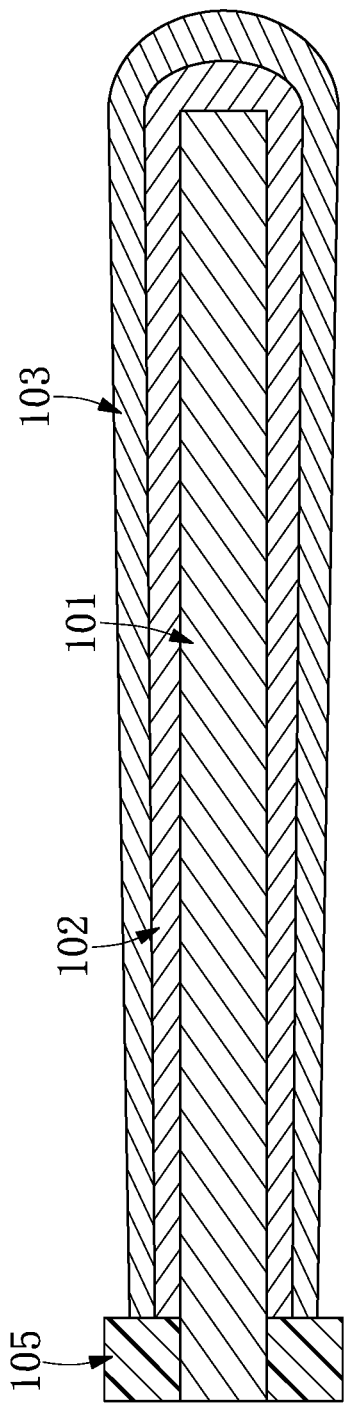
FIG. 6 is a schematic view of a step S1008 of the method of manufacturing the capacitor assembly package structure according to the first embodiment of the present disclosure.
Figure 7:
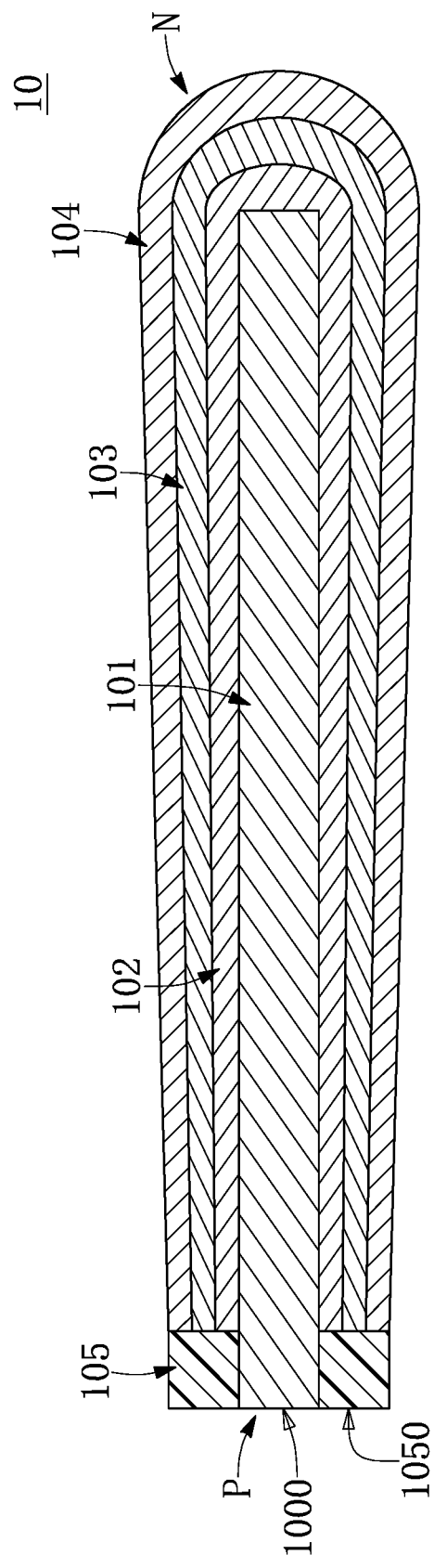
FIG. 7 is a schematic view of a step S1010 of the method of manufacturing the capacitor assembly package structure according to the first embodiment of the present disclosure.
Figure 8:
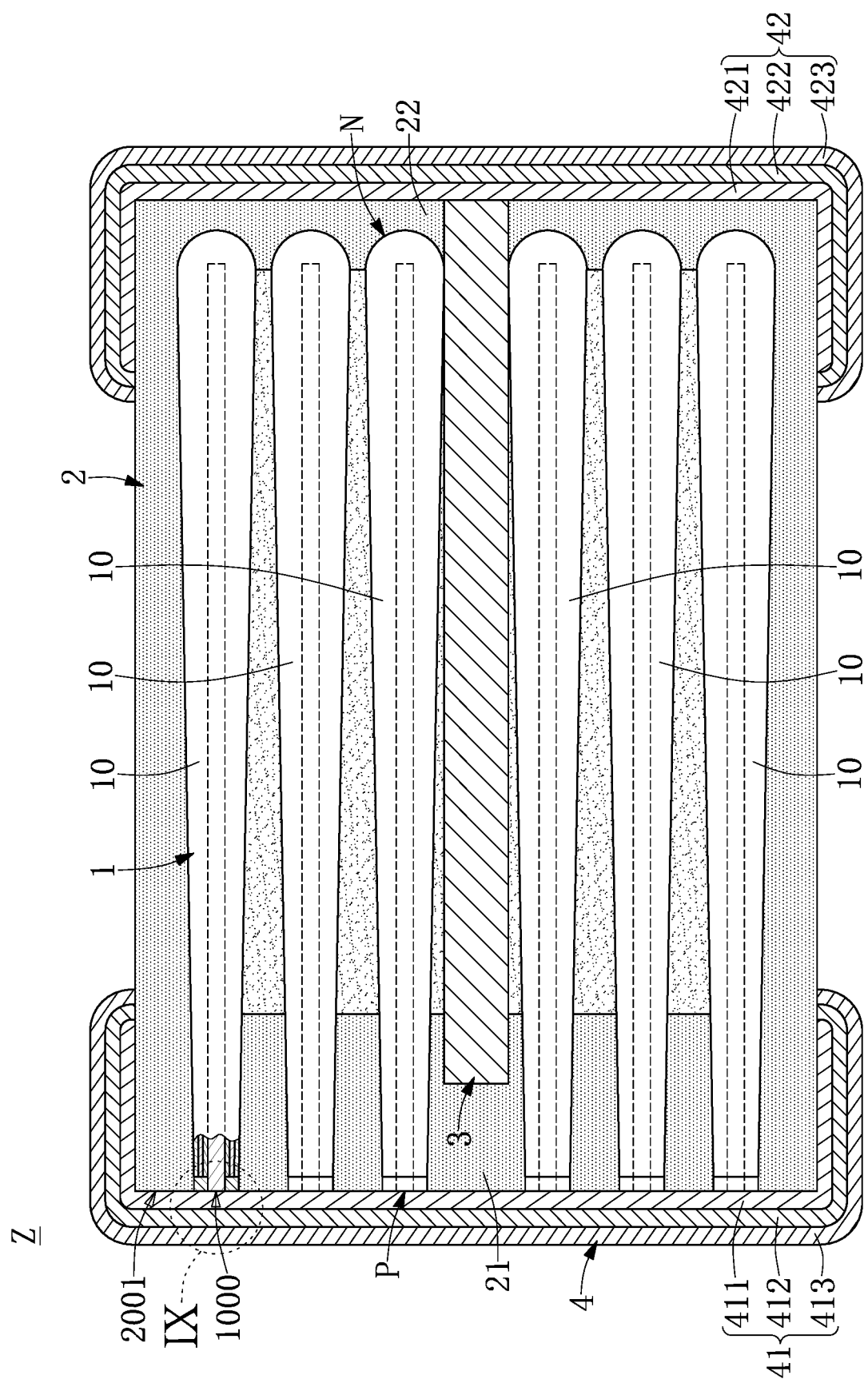
FIG. 8 is a cross-sectional view of the capacitor assembly package structure according to the first embodiment of the present disclosure.
Figure 9:
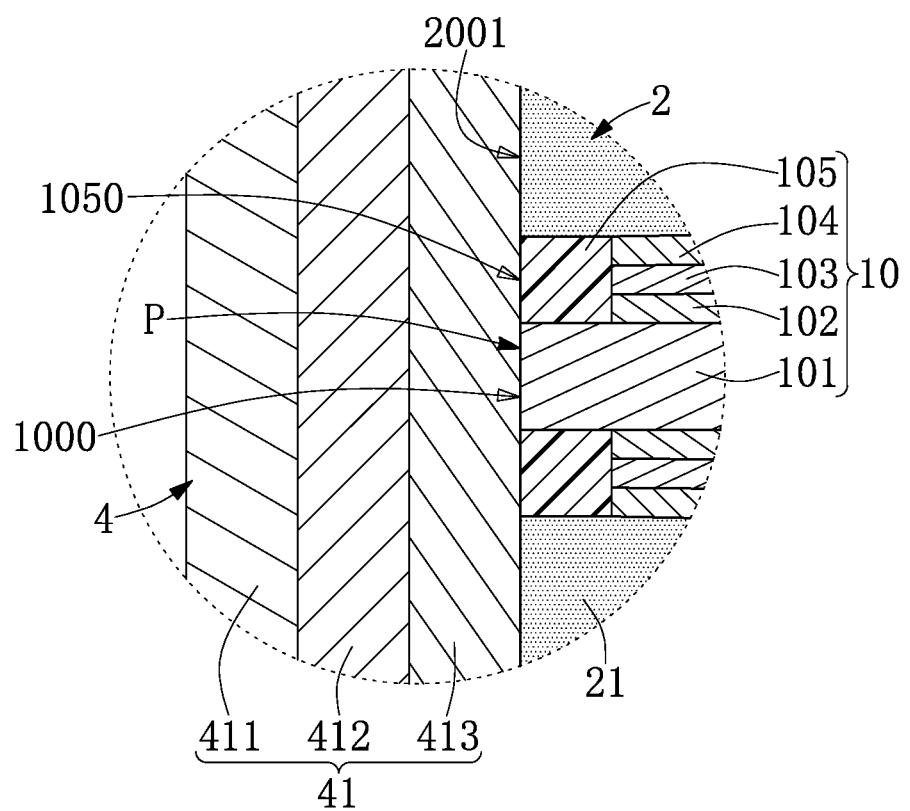
FIG. 9 shows an enlarged view of part IX of FIG. 8.

Referring to FIG. 1 to FIG. 9, a first embodiment of the present disclosure provides a method of manufacturing a capacitor assembly package structure Z, including the following steps: firstly, referring to FIG. 1, FIG. 7 and FIG. 8, providing a capacitor unit 1 and a conductive connection layer 3, wherein the capacitor unit 1 includes a plurality of capacitors 10, and each of the capacitors 10 includes a positive portion P and a negative portion N electrically connected to the conductive connection layer 3 (step S100); next, referring to FIG. 1, FIG. 8 and FIG. 9, partially enclosing the capacitors 10 by an insulative package body 2, wherein the positive portion P of each of the capacitors 10 has a positive lateral surface 1000 exposed from a first lateral surface 2001 of the insulative package body 2 (step S102); and then referring to FIG. 1, FIG. 8 and FIG. 9, enclosing a first portion 21 of the insulative package body 2 and electrically connecting to the positive portion P of each of the capacitors 10 by a first electrode structure 41, and enclosing a second portion 22 of the insulative package body 2 and electrically connecting to the conductive connection layer 3 by a second electrode structure 42 (step S104). It should be noted that each of the capacitors 10 includes a surrounding insulative layer 105, and all of the first lateral surface 2001 of the insulative package body 2, the positive lateral surface 1000 of the positive portion P and a lateral surface 1050 of the surrounding insulative layer 105 are flush with each other as shown in FIG. 6 and FIG. 7.

Figure 2:
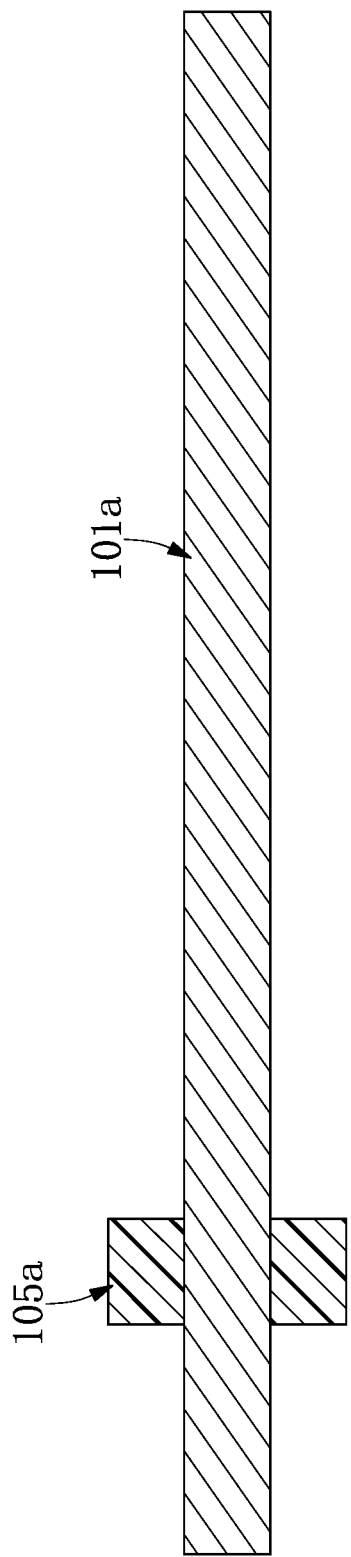
FIG. 2 is a schematic view of a step S1000 and a step S1002 of the method of manufacturing the capacitor assembly package structure according to the first embodiment of the present disclosure.
Figure 3:
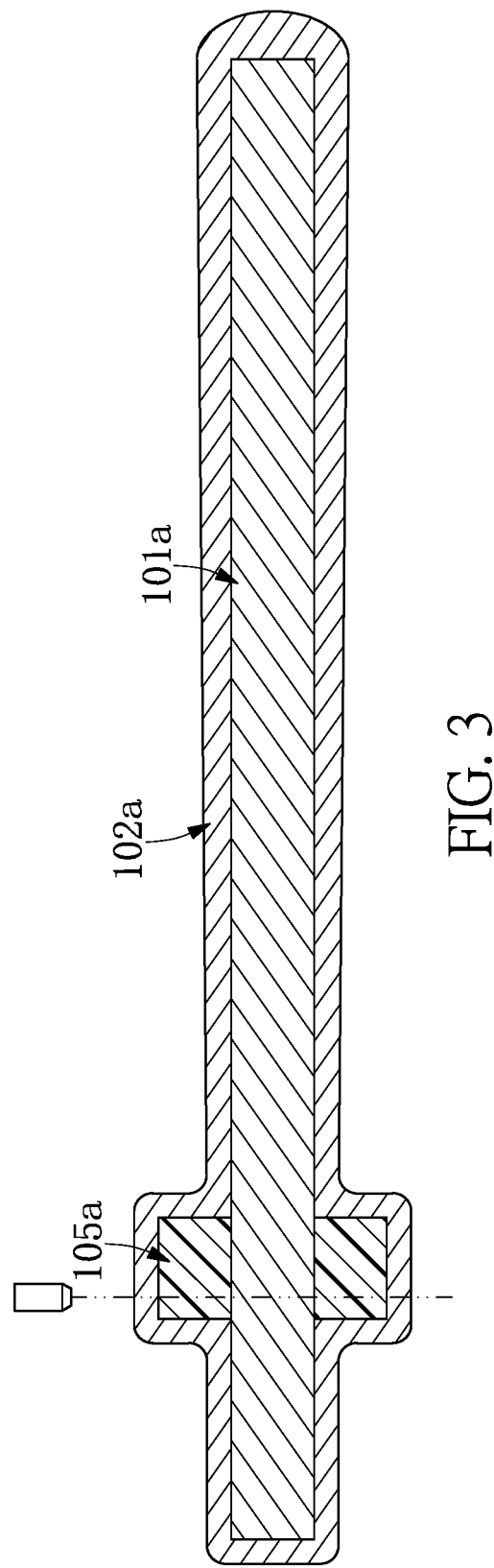
FIG. 3 is a schematic view of a step S1004 of the method of manufacturing the capacitor assembly package structure according to the first embodiment of the present disclosure.

For example, referring to FIG. 1 to FIG. 7, a method of manufacturing each of the capacitors 10 includes the following steps: referring to FIG. 1 and FIG. 2, providing an initial substrate 101a (step S1000), and then forming an initial surrounding insulative layer 105a disposed on the initial substrate 101a and around the initial substrate 101a (step S1002); next, referring to FIG. 1, FIG. 2 and FIG. 3, forming a conductive polymer material 102a for enclosing the initial substrate 101a and the initial surrounding insulative layer 105a (step S1004); afterwards, referring to FIG. 1, FIG. 4 and FIG. 5, removing a part of the initial substrate 101a, a part of the initial surrounding insulative layer 105a and a part of the conductive polymer material 102a to respectively form a substrate 101, a surrounding insulative layer 105 disposed around the substrate 101, and a conductive polymer layer 102 enclosing a portion of the substrate 101 (step S1006); subsequently, referring to FIG. 1, FIG. 5 and FIG. 6, forming a carbon paste layer 103 for fully enclosing the conductive polymer layer 102 (step S1008); and then referring to FIG. 1, FIG. 6 and FIG. 7, forming a silver paste layer 104 for fully enclosing the carbon paste layer 103 (step S1010). It should be noted that only a part of the initial substrate 101a and a part of the conductive polymer material 102a are removed (a part of the initial surrounding insulative layer 105a is remained) in another embodiment of the step S1006, so that the surrounding insulative layer 105 is the same as the initial surrounding insulative layer 105a that has not been cut yet, and the surrounding insulative layer 105 is fully enclosed by the conductive polymer layer 102. Hence, the first lateral surface 2001 of the insulative package body 2 is flush with the positive lateral surface 1000 of the positive portion P, but is not flush with the lateral surface 1050 of the surrounding insulative layer 105.

Therefore, referring to FIG. 7, FIG. 8 and FIG. 9, the first embodiment of the present disclosure provides a capacitor assembly package structure Z, including a capacitor unit 1, an insulative package body 2, a conductive connection layer 3 and an electrode unit 4. The capacitor unit 1 includes a plurality of capacitors 10, and each of the capacitors 10 includes a positive portion P and a negative portion N. The insulative package body 2 can partially enclose the capacitors 10, and the positive portion P of each of the capacitors 10 has a positive lateral surface 1000 exposed from a first lateral surface 2001 of the insulative package body 2. The conductive connection layer 3 is electrically connected to the negative portion N of the capacitor 10. The electrode unit 4 includes a first electrode structure 41 and a second electrode structure 42. The first electrode structure 41 can enclose a first portion 21 of the insulative package body 2 and electrically connect to the positive portion P of each of the capacitors 10, and the second electrode structure 42 can enclose a second portion 22 of the insulative package body 2 and electrically connect to the conductive connection layer 3. More particularly, referring to FIG. 8 and FIG. 9, the first lateral surface 2001 of the insulative package body 2, the positive lateral surface 1000 of the positive portion P and a lateral surface 1050 of the surrounding insulative layer 105 can be flush with each other.

For example, as shown in FIG. 7, each of the capacitors 10 includes a substrate 101, a conductive polymer layer 102 enclosing a portion of the substrate 101, a carbon paste layer 103 fully enclosing the conductive polymer layer 102, and a silver paste layer 104 fully enclosing the carbon paste layer 103. In addition, each of the capacitors 10 further includes a surrounding insulative layer 105 disposed on an outer surface of the substrate 101 and around the substrate 101, and lengths of the conductive polymer layer 102, the carbon paste layer 103 and the silver paste layer 104 of the capacitor 10 can be limited or restricted by the surrounding insulative layer 105. It should be noted that the substrate 101 further includes a metal foil and an oxidation layer for fully enclosing the metal foil. The oxidation layer can be formed on an outer surface of the metal foil so as to fully enclose the metal foil, and the conductive polymer layer 102 can enclose a portion of the oxidation layer. In addition, the metal foil may be made of Al, Cu or any metal material according to different requirements. The metal foil has a porous corrosion layer formed on a surface thereof, so that the metal foil may be a corrosion foil having the porous corrosion layer. When the metal foil is oxidized, the oxidation layer is formed on the outer surface of the metal foil, and the metal foil with the oxidation layer can be referred to as a valve metal foil. However, the aforementioned description for the capacitor 10 is merely an example and is not meant to limit the scope of the present disclosure.

For example, as shown in FIG. 8, the insulative package body 2 may be made of any insulative material such as epoxy or silicon. However, the aforementioned description for the insulative package body 2 is merely an example and is not meant to limit the scope of the present disclosure. Moreover, the first electrode structure 41 includes a first inner conductive layer 411 covering the first portion 21 of the insulative package body 2 and being electrically connected to the positive portion P of the capacitor 10, a first middle conductive layer 412 covering the first inner conductive layer 411, and a first outer conductive layer 413 covering the first middle conductive layer 412. In addition, the second electrode structure 42 includes a second inner conductive layer 421 covering the second portion 22 of the insulative package body 2 and being electrically connected to the conductive connection layer 3, a second middle conductive layer 422 covering the second inner conductive layer 421, and a second outer conductive layer 423 covering the second middle conductive layer 422. Moreover, both the first inner conductive layer 411 and the second inner conductive layer 421 may be Ag layers, both the first middle conductive layer 412 and the second middle conductive layer 422 may be Ni layers, and both the first outer conductive layer 413 and the second outer conductive layer 423 may be Sn layers. However, the aforementioned description for the first electrode structure 41 and the second electrode structure 42 is merely an example and is not meant to limit the scope of the present disclosure.

Second Embodiment

Figure 10:
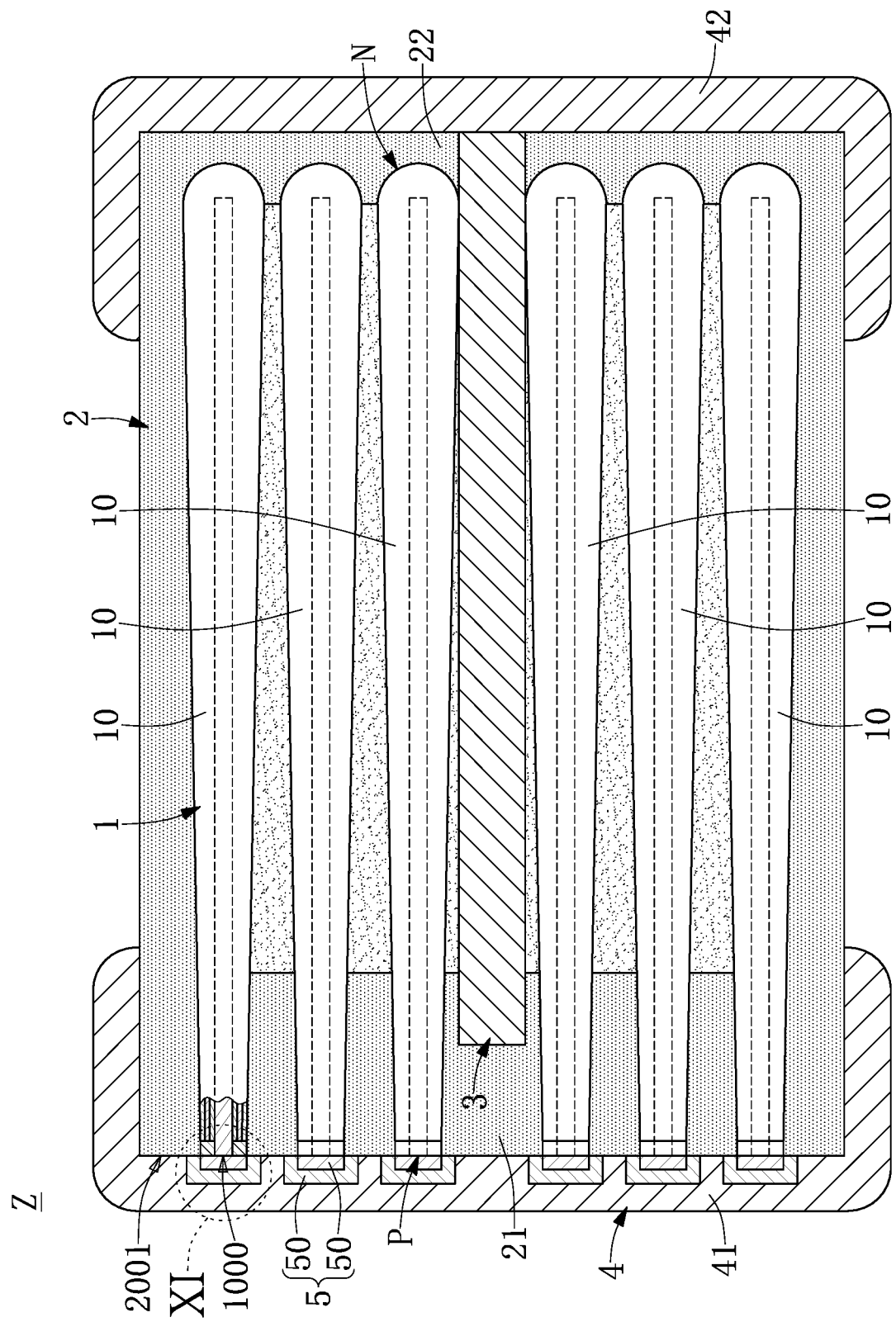
FIG. 10 is a cross-sectional view of a capacitor assembly package structure according to a second embodiment of the present disclosure.
Figure 11:
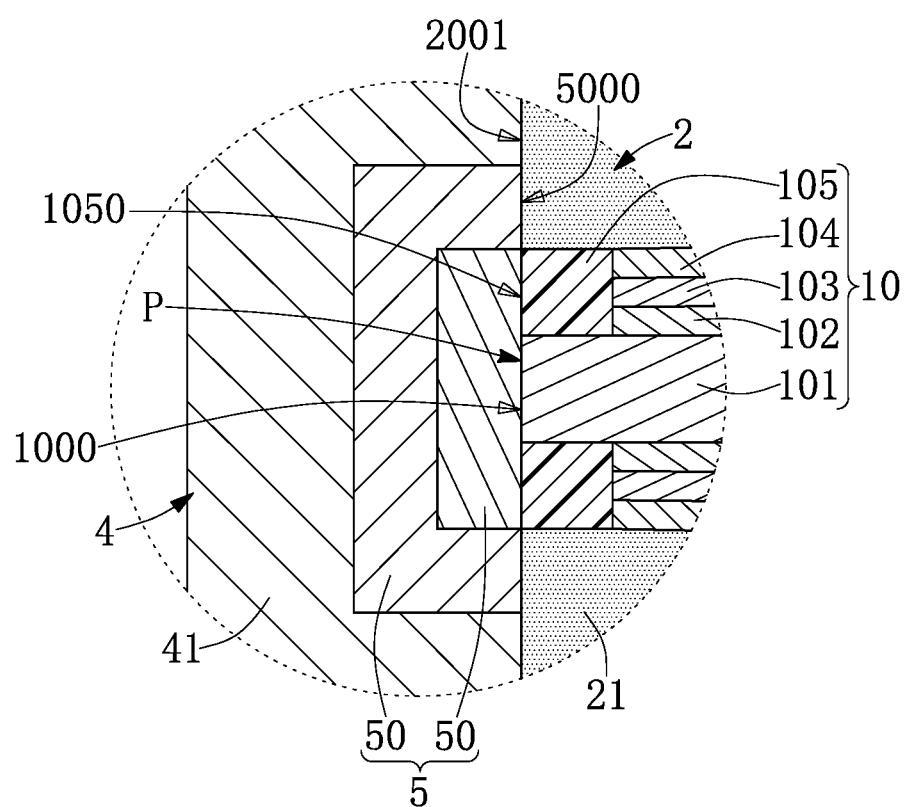
FIG. 11 shows an enlarged view of part XI of FIG. 10.

Referring to FIG. 10 to FIG. 11, a second embodiment of the present disclosure provides a capacitor assembly package structure Z, including a capacitor unit 1, an insulative package body 2, a conductive connection layer 3 and an electrode unit 4. Comparing FIG. 10 with FIG. 8, and comparing FIG. 11 with FIG. 9, the difference between the second embodiment and the first embodiment is as follows: in the second embodiment, the capacitor assembly package structure Z further includes a plurality of positive composite material layers 5. Each of the positive composite material layers 5 is disposed on the first lateral surface 2001 of the insulative package body 2 and the positive lateral surface 1000 of the corresponding positive portion P so as to electrically connect to the positive portion P of the corresponding capacitor 10, and the first electrode structure 41 can electrically contact the positive composite material layers 5. For example, the positive composite material layer 5 includes at least two positive conductive layers 50, and the positive conductive layer 50 may be made of Zn, Au, Pt, Pd, Ti, Ni, Ag, Cu, Cr or Sn, or the positive conductive layer 50 may be an alloy such as NiCr, TiW, TiN or TiC. However, the aforementioned description for the positive composite material layer 5 is merely an example and is not meant to limit the scope of the present disclosure.

Referring to FIG. 11, it should be noted that the first lateral surface 2001 of the insulative package body 2 and the positive lateral surface 1000 of the positive portion P can be flush with each other, and the positive composite material layer 5 has a plane 5000 contacting the first lateral surface 2001 of the insulative package body 2 and the positive lateral surface 1000 of the positive portion P. In addition, the plane 5000 of the positive composite material layer 5 can contact all of the first lateral surface 2001 of the insulative package body 2, the positive lateral surface 1000 of the positive portion P and the lateral surface 1050 of the surrounding insulative layer 105 so as to prevent external moisture from entering the capacitors 10 along the positive portion P.

Comparing FIG. 10 with FIG. 8, and comparing FIG. 11 with FIG. 9, the difference between the second embodiment and the first embodiment is as follows: the second embodiment of the present disclosure provides a method of manufacturing a capacitor assembly package structure Z, further including: forming a plurality of positive composite material layers 5 each disposed on the first lateral surface 2001 of the insulative package body 2 and the positive lateral surface 1000 of the corresponding positive portion P so as to electrically connect to the positive portion P of the corresponding capacitor 10.

Third Embodiment

Figure 12:
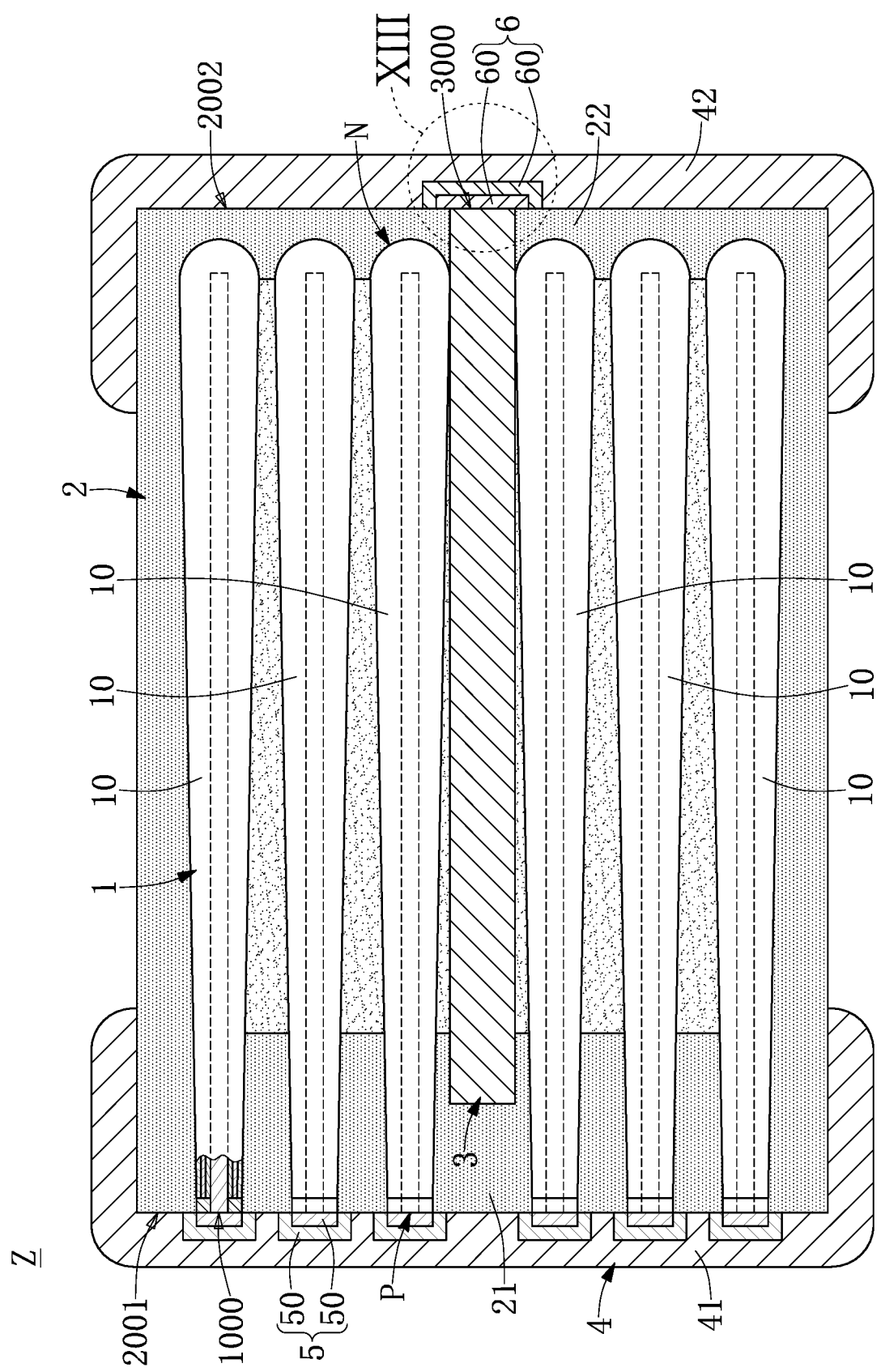
FIG. 12 is a cross-sectional view of a capacitor assembly package structure according to a third embodiment of the present disclosure.
Figure 13:
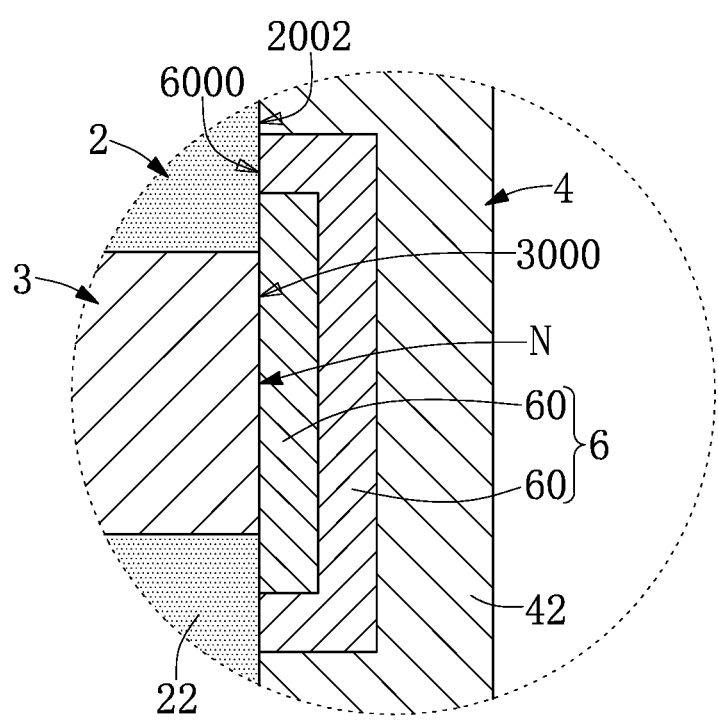
FIG. 13 shows an enlarged view of part XIII of FIG. 12.

Referring to FIG. 12 to FIG. 13, a third embodiment of the present disclosure provides a capacitor assembly package structure Z, including a capacitor unit 1, an insulative package body 2, a conductive connection layer 3 and an electrode unit 4. Comparing FIG. 12 with FIG. 10, and comparing FIG. 13 with FIG. 11, the difference between the third embodiment and the first embodiment is as follows: in the third embodiment, the capacitor assembly package structure Z further includes a negative composite material layer 6. The negative composite material layer 6 is disposed on a lateral surface 3000 of the conductive connection surface 3 so as to electrically connect to the negative portion N of the capacitor 10, and the second electrode structure 42 can electrically contact the negative composite material layer 6. For example, the negative composite material layer 6 includes at least two negative conductive layers 60, and the negative conductive layer 60 may be made of Zn, Au, Pt, Pd, Ti, Ni, Ag, Cu, Cr or Sn, or the negative conductive layer 60 may be an alloy such as NiCr, TiW, TiN or TiC. However, the aforementioned description for the negative composite material layer 6 is merely an example and is not meant to limit the scope of the present disclosure.

Referring to FIG. 13, it should be noted that the second lateral surface 2002 of the insulative package body 2 and the lateral surface 3000 of the conductive connection layer 3 can be flush with each other, and the negative composite material layer 6 has a plane 6000 contacting the second lateral surface 2002 of the insulative package body 2 and the lateral surface 3000 of the conductive connection layer 3 so as to prevent external moisture from entering the capacitors 10 along the conductive connection layer 3.

Comparing FIG. 12 with FIG. 10, and comparing FIG. 13 with FIG. 11, the difference between the third embodiment and the first embodiment is as follows: the third embodiment of the present disclosure provides a method of manufacturing a capacitor assembly package structure Z, further including: forming a negative composite material layer 6 disposed on a second lateral surface 2002 of the insulative package body 2 and a lateral surface 3000 of the conductive connection surface 3 so as to electrically connect to the negative portion N of the capacitor 10.

In conclusion, by virtue of "the positive portion P of the capacitor 10 has a positive lateral surface 1000 exposed from a first lateral surface 2001 of the insulative package body 2", when the first electrode structure 41 encloses a first portion 21 of the insulative package body 2, the first electrode structure 41 can electrically connect to the positive portion P of the capacitor 10. However, the aforementioned description is merely an example and is not meant to limit the scope of the present disclosure. It should be noted that the first lateral surface 2001 of the insulative package body 2, the positive lateral surface 1000 of the positive portion P and a lateral surface 1050 of the surrounding insulative layer 105 can be flush with each other, and the second lateral surface 2002 of the insulative package body 2 and the lateral surface 3000 of the conductive connection layer 3 can be flush with each other.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

The invention claimed is:

1. A capacitor assembly package structure, comprising:
  a capacitor unit including a plurality of capacitors, wherein each of the capacitors includes a positive portion and a negative portion;
  an insulative package body for partially enclosing the capacitors, wherein the positive portion of each of the capacitors has a positive lateral surface exposed from a first lateral surface of the insulative package body;
  a conductive connection layer electrically connected to the negative portion of each of the capacitors;
  an electrode unit including a first electrode structure and a second electrode structure, wherein the first electrode structure encloses a first portion of the insulative package body and electrically connects to the positive portion of each of the capacitors, and the second electrode structure encloses a second portion of the insulative package body and electrically connects to the conductive connection layer; and
  a negative composite material layer disposed on a second lateral surface of the insulative package body and a lateral surface of the conductive connection layer so as to electrically connect to the negative portion of the capacitor, wherein the second electrode structure electrically contacts the negative composite material layer;
  wherein the negative composite material layer includes at least two negative conductive layers that are divided into a first negative conductive layer disposed on the second lateral surface of the insulative package body and the lateral surface of the conductive connection layer, and a second negative conductive layer for covering the first negative conductive layer;
  wherein the first negative conductive layer has a first top plane surface covered by the second negative conductive layer, and a first surrounding surface connected with the first top plane surface, and the second negative conductive layer has a second top plane surface covered by the second electrode structure, and a second surrounding surface connected with the second top plane;
  wherein the first electrode structure includes a first inner conductive layer covering the first portion of the insulative package body and being electrically connected to the positive portion of the capacitor, a first middle conductive layer covering the first inner conductive layer, and a first outer conductive layer covering the first middle conductive layer;
  wherein the second electrode structure includes a second inner conductive layer covering the second portion of the insulative package body and being electrically connected to the conductive connection layer, a second middle conductive layer covering the second inner conductive layer, and a second outer conductive layer covering the second middle conductive layer;
  wherein the insulative package body has a top surface and a bottom surface opposite to the top surface, the top surface and the bottom surface of the insulative package body are connected between the first lateral surface and the second lateral surface;
  wherein the first electrode structure and the second electrode structure contact the top surface and the bottom surface of the insulative package body;
  wherein the negative composite material layer is only disposed on the second lateral surface of the insulative package body.

2. The capacitor assembly package structure according to claim 1, further comprising: a plurality of positive composite material layers each disposed on the first lateral surface of the insulative package body and the positive lateral surface of the corresponding positive portion so as to electrically connect to the positive portion of the corresponding capacitor; wherein the first electrode structure electrically contacts the positive composite material layers, each of the positive composite material layers includes at least two positive conductive layers, and the positive conductive layers are made of Pt, Pd, Ti, or Cr; wherein the first lateral surface of the insulative package body and the positive lateral surface of the positive portion are flush with each other, and the positive composite material layer has a plane contacting the first lateral surface of the insulative package body and the positive lateral surface of the positive portion.

3. The capacitor assembly package structure according to claim 1, wherein the negative conductive layers are made of Pt, Pd, Ti, or Cr; wherein the second lateral surface of the insulative package body and the lateral surface of the conductive connection layer are flush with each other, and the negative composite material layer has a plane contacting the second lateral surface of the insulative package body and the lateral surface of the conductive connection layer.

4. The capacitor assembly package structure according to claim 1, wherein both the first inner conductive layer and the second inner conductive layer are Ag layers, both the first middle conductive layer and the second middle conductive layer are Ni layers, and both the first outer conductive layer and the second outer conductive layer are Sn layers.

5. The capacitor assembly package structure according to claim 1, wherein each of the capacitors includes a substrate, a conductive polymer layer enclosing a portion of the substrate, a carbon paste layer fully enclosing the conductive polymer layer, and a silver paste layer fully enclosing the carbon paste layer; wherein each of the capacitors includes a surrounding insulative layer disposed on an outer surface of the substrate and around the substrate, and lengths of the conductive polymer layer, the carbon paste layer and the silver paste layer of the capacitor are limited by the surrounding insulative layer; wherein the first lateral surface of the insulative package body, the positive lateral surface of the positive portion and a lateral surface of the surrounding insulative layer are flush with each other.

6. A capacitor assembly package structure, comprising:
a capacitor including a positive portion, a negative portion and a surrounding insulative layer;
an insulative package body for partially enclosing the capacitor, wherein the positive portion of the capacitor has a positive lateral surface exposed from a first lateral surface of the insulative package body;
a conductive connection layer electrically connected to the negative portion of the capacitor;
an electrode unit including a first electrode structure and a second electrode structure, wherein the first electrode structure encloses a first portion of the insulative package body and electrically connects to the positive portion of the capacitor, and the second electrode structure encloses a second portion of the insulative package body and electrically connects to the conductive connection layer; and
a negative composite material layer disposed on a second lateral surface of the insulative package body and a lateral surface of the conductive connection layer so as to electrically connect to the negative portion of the capacitor, wherein the second electrode structure electrically contacts the negative composite material layer;
wherein the first lateral surface of the insulative package body, the positive lateral surface of the positive portion and a lateral surface of the surrounding insulative layer are flush with each other;
wherein the negative composite material layer includes a first negative conductive layer disposed on the second lateral surface of the insulative package body and the lateral surface of the conductive connection layer, and a second negative conductive layer for covering the first negative conductive layer;
wherein the first negative conductive layer has a first top plane surface covered by the second negative conductive layer, and a first surrounding surface connected with the first top plane surface, and the second negative conductive layer has a second top plane surface covered by the second electrode structure, and a second surrounding surface connected with the second top plane;
wherein the first electrode structure includes a first inner conductive layer covering the first portion of the insulative package body and being electrically connected to the positive portion of the capacitor, a first middle conductive layer covering the first inner conductive layer, and a first outer conductive layer covering the first middle conductive layer;
wherein the second electrode structure includes a second inner conductive layer covering the second portion of the insulative package body and being electrically connected to the conductive connection layer, a second middle conductive layer covering the second inner conductive layer, and a second outer conductive layer covering the second middle conductive layer;
wherein the insulative package body has a top surface and a bottom surface opposite to the top surface, the top surface and the bottom surface of the insulative package body are connected between the first lateral surface and the second lateral surface;
wherein the first electrode structure and the second electrode structure contact the top surface and the bottom surface of the insulative package body;
wherein the negative composite material layer is only disposed on the second lateral surface of the insulative package body.

\* \* \* \* \*